United States Patent
Deak, Sr.

(10) Patent No.: US 9,543,817 B2
(45) Date of Patent: Jan. 10, 2017

(54) HOLLOW MAGNETIC METAL CORE PULSE ENERGY HARVESTING GENERATOR

(71) Applicant: David Deak, Sr., Nesconset, NY (US)

(72) Inventor: David Deak, Sr., Nesconset, NY (US)

( * ) Notice: Subject to any disclaimer, the term of this patent is extended or adjusted under 35 U.S.C. 154(b) by 0 days.

(21) Appl. No.: 14/715,971

(22) Filed: May 19, 2015

(65) Prior Publication Data
US 2015/0357893 A1    Dec. 10, 2015

Related U.S. Application Data

(60) Provisional application No. 62/009,194, filed on Jun. 7, 2014.

(51) Int. Cl.
*H02K 35/06* (2006.01)
*H02K 35/02* (2006.01)

(52) U.S. Cl.
CPC .............. *H02K 35/06* (2013.01); *H02K 35/02* (2013.01)

(58) Field of Classification Search
CPC ....................................................... H02K 35/06
USPC ............................... 310/15, 30, 34, 38; 335/4
See application file for complete search history.

(56) References Cited

U.S. PATENT DOCUMENTS

2013/0093540 A1* 4/2013 Ruff .......................... E04B 1/21
335/4

OTHER PUBLICATIONS https://www.google.com/search?q=magnetic+interaction&biw=1920&bih=1115&source=lnms&tbm=isch&sa=X&ved=0ahUKEwjby5SLtuHKAhUCOWMKHaQUDb4Q_AUIBigB#imgrc=rCMVDdr68luSXM%3A.*

* cited by examiner

*Primary Examiner* — Terrance Kenerly

(57) ABSTRACT

This invention relates to energy harvesting of electrical energy by the change in a magnetic circuitous permeability path for magnetic lines of force that move through a coil of wire to induce, by Faraday's Law of Electromotive Induction, an electromotive force at the coil winding terminals of an associated coil. An abrupt, substantially instant change generated by a magnet's axial or angular mechanical and magnetic contact or dislocation through instant movement of the magnet by magnetic unlike pole spring back attractive force action with a high permeability stationary hollow or solid magnetic metal core centered in a coil bobbin with a wire wound wire coil providing efficient electrical generation therefrom.

17 Claims, 14 Drawing Sheets

900

HOLLOW MAGNETIC METAL CORE PULSE ENERGY HARVESTING GENERATOR

The present invention claims priority of Provisional Patent Application entitled A HOLLOW MAGNETIC METAL CORE PULSE ENERGY HARVESTING GENERATOR, Ser. No. 62/009,194 filed 7 Jun. 2014 by the same inventor, also incorporated by reference.

FIELD OF THE INVENTION

The present invention relates to energy harvesting electrical generators, in particular, push-button operated electromagnetically induced electrical generation.

BACKGROUND OF THE INVENTION

There is some prior art in the field of self-powered electrical energy generators that include various methodologies of generation. The present invention relates to electric generators and the generation of electricity from same; along with a plurality of novel embodiments and applications utilizing these features of novelty. The evolution of electric generators since the inception of Galvani and later Faraday in 1821 and in 1831; has progressed along the conventional knowledge of moving a coil through a stationary magnetic field or in some demonstrable instances, the motion of a magnet through a stationary coil. However the dominating influence of generators incorporating an internal moving coil about a stationary magnetic field remains the mainstay of global electrical power generation on any scale. Further, in all cases of a magnet in motion about a stationary coil, the shape of said magnet(s) is of the bar, horseshoe, or other non-spherical magnet shape means; nor a magnetic shape means of encompassing a 360 degree circle as part and parcel to said magnet(s).

SUMMARY

The present invention teaches a novel apparatus and method of causing a magnet to be in substantially instant 'magnetic attractive force' contact with a stationary magnetic metal 'solid' or 'hollow' core centered throughout a coil bobbin that has a wound wire coil and at a different moment in time causing the action of the magnet's abrupt, substantially instant dislocating and breaking away from the 'magnetic attractive force' contact with the stationary magnetic metal 'solid' or 'hollow' core, and whereby this dual action has a natural spring like effect due to the 'magnetic attractive force' to bring the magnet back in instant contact with the stationary magnetic metal core.

The present invention according to various embodiments, provides the generating pulsed electrical energy by the substantially instant 'make and break' contact of an axially poled magnet (e.g. "N" on one side and "S" on the other, opposite side) and a stationary magnetic high permeability (e.g. metal as opposed to air) hollow (or solid) core over a portion of the magnetic circuit (a flux path from the magnet's N to S pole), including magnetic materials such as lamination steel, silicon electrical steel, silicon steel, relay steel, "metallic glass", or transformer steel, is specialty steel tailored to produce certain magnetic properties, such as a small hysteresis area (small energy dissipation per cycle, or low core loss) and high permeability, iron, or metallic glass, utilized as a magnetic hollow core, but not limited to a hollow core, high permeability path for magnetic lines of force to travel through upon contact of the moving axially poled magnet and the stationary core, thus the axially poled magnet by action of the instant contact and the counterpart action of causing the axially poled magnet to break contact with the high permeability stationary magnetic metal core that is disposed through a coil bobbin of wound wire coil that further causes the magnetic lines of force to instantly expand and cut across, at a perpendicular angle, the coil turns of wire and inducing a pulsed electromotive force that has a time duration in tens of milliseconds felt at the terminals of the coil. The remaining portions of the magnetic circuit are typically air or other relatively lower permeability material(s). Further the action of instant contact at a time designated as any time t1 and any time thereafter the action of instant breakaway from contact designated as t2, will induce two different and separate pulses of electromotive force felt at the coil terminals and whereby the pulse at time t2 will be of opposite polarity of the pulse at time t1. This close proximity of the magnet to the high permeability magnetic metal core, has an attractive force and this breakaway action causes the overall spring back return of the axially poled magnet to make contact and be in mechanical communication with the stationary magnetic metal core. This natural spring back magnetic attraction eliminates any need for a mechanical spring component thus making a spring action behavior from a magnetic field between a pole of the magnet and the high permeability coil core. The action of "making and breaking" contact with a axially poled magnet and a magnetic metal core, is constructed such that the magnet has its poles parallel to guide rods that move up and down or side to side to make and break mechanical and magnetic contact between the magnet and said stationary magnetic metal hollow core. The distance between axially poled magnet and the stationary magnetic metal (high permeability) core, can be adjustable for different push button type of voltage resultant action for use in a battery-less and wireless electrical remote switch system, whereby the magnet range of motion distance is, by one experiment, measured to be in the range of 2 to 10 millimeters separation for a magnet having a field of approximately 3,500 Gauss and a hollow magnetic metal core of 6.28 mm inner diameter and 9.5 mm outer diameter. Preferably, a ratio of OD to ID of the hollow core is best around 1.5 or greater.

The instant action of "make and break" between the moving axially poled magnet and the stationary magnetic metal core, is the physical action of one of the axially poled magnet's pole surfaces being directly in communication with the planar surface of the stationary magnetic metal core.

Another feature of the present invention provides an axially poled magnet make and break contact with a stationary magnetic metal core, preferably a hollow core, that is disposed through substantially the center of a coil bobbin of wound coil wire and this "make and break" contact action is accomplished by angular motion of said axially poled magnet against the planar surface of the stationary magnetic metal core. The instant action of "make and break" between the moving axially poled magnet and the stationary magnetic metal core, is the physical action of one of the axially poled magnet's pole surface being directly in communication with the planar surface of the stationary magnetic metal hollow core, through the instant action of angular motion. Further the action of instant contact at a time designated as any time t1 and any time thereafter, the action of instant breakaway from contact designated as t2, will induce two different and separate pulses of electromotive force felt at the coil terminals and whereby the pulse at time t2 will be of opposite polarity of the pulse at time t1. A sufficiently close proximity of the magnet to the metal hollow core is maintained throughout the travel of the magnet to provide an attractive force even after this breakaway action, providing a 'spring back' return of the axially poled magnet to make contact and be in mechanical communication with the stationary magnetic metal core. This natural spring back magnetic attraction eliminates any need for a mechanical spring component thus making a "spring action behavior" by a magnetic field.

Another intention of the of the present invention, which can be considered as a preferred embodiment, is that of the instant action of having an axially poled magnet make and break contact with a stationary magnetic metal core that is disposed through the center hole of a coil bobbin of wound coil wire and this "make and break" contact action is accomplished by axial motion of the axially poled magnet against the planar surface of the stationary magnetic core. The axial motion is that action of moving a non-metallic or non-magnetic metal single push rod through the center of the hollow magnetic metal, but not limited to a hollow core. The instant action of close and open high permeability magnetic connection between the moving axially poled magnet and the stationary magnetic core around its rim circular edge is the physical action of one of the axially poled magnet's pole surface being directly in connection with the planar surface of the stationary magnetic core through the instant action of axial motion of the non-metallic or nonmagnetic metal single push rod. Further the action of an abrupt, substantially instant contact at a time designated as any time t1 and any time thereafter, the action of an abrupt, substantially instant breakaway from contact designated as t2, will induce two different and separate pulses of electromotive force felt at the coil terminals and whereby the pulse at time t2 will be of opposite polarity of the pulse at time t1. This close proximity of the axial poled magnet to the core has an attractive force and this opening action causes the overall spring back return of the axially poled magnet to make contact and be in mechanical communication with the stationary high permeability magnetic core. This natural spring back magnetic attraction eliminates any need for a mechanical spring component thus making a spring action behavior by a magnetic field.

Another feature of an embodiment of the present invention is for using a small pilot magnet that is disposed and stationary at the bottom end of the push rod and is axially aligned with the "make and break" movable axial poled magnet, and whereby the pilot magnet has its attractive pole (N) or (S) facing and being in attractive magnetic communication and touching with the axial oppositely-poled attractive pole (S) or (N) movable magnet so as to make the push rod magnetically stick to the axial poled moveable magnet. Acting as a "magnetic glue" to hold the push rod stationary with the axial poled movable magnet for push and spring back action without having the push rod move, fall, or be shot out of a hollow magnetic metal core.

BRIEF DESCRIPTION OF THE DRAWINGS

These and further embodiments according to the present invention will be better understood by reading the following Detailed Description, taken together with the Drawings, wherein.

DETAILED DESCRIPTION

Figure 1:
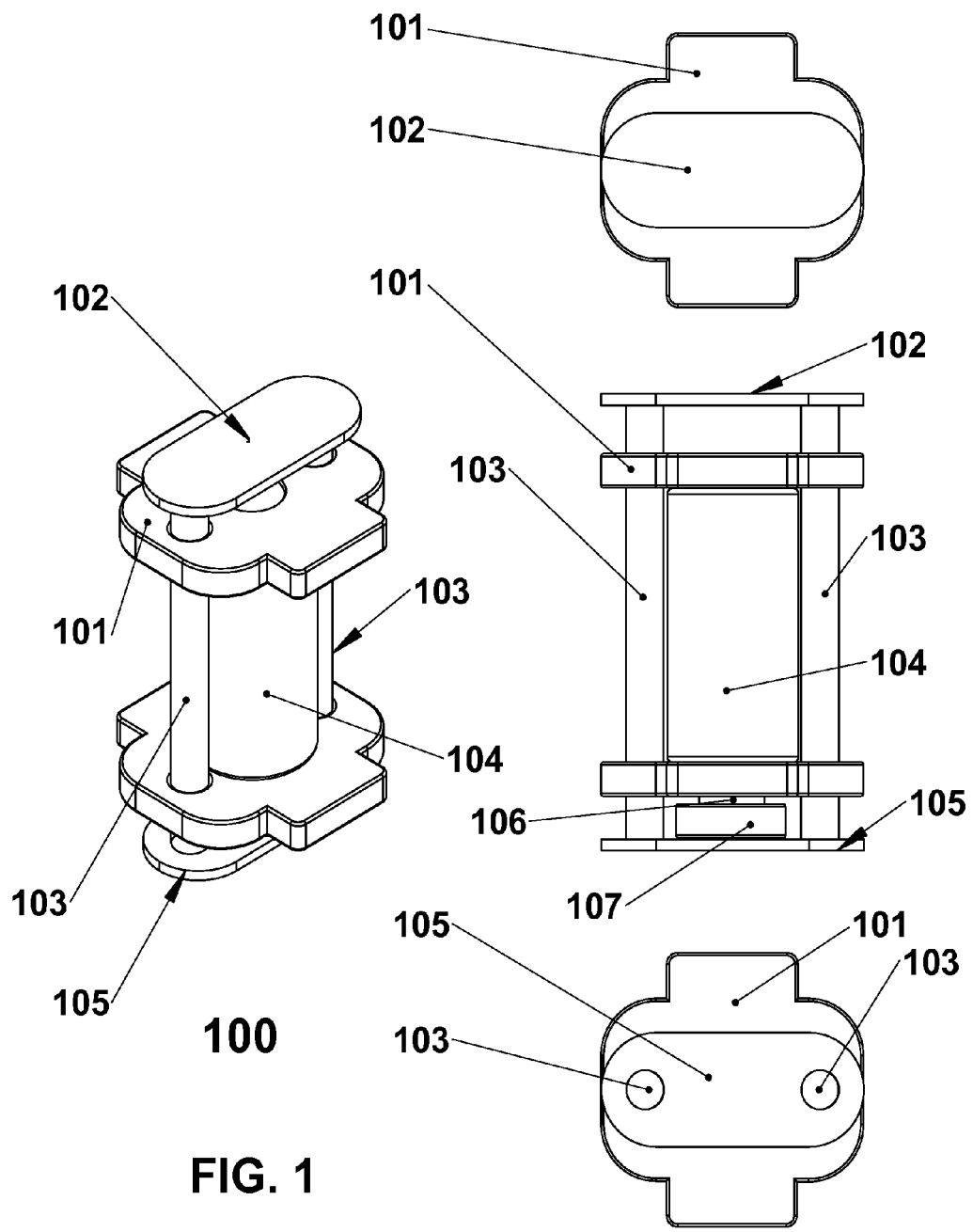
FIG. 1 is a drawing depicting the components of the first embodiment of the pulse push button energy harvesting generator invention, where the axially poled magnet is in vertical position "make-contact" with the hollow magnetic metal core.

In the embodiment 100 of FIG. 1 a coil bobbin embodiment 101 is made with holes to accommodate two parallel disposed movable guide push rods 103 that are connected together by top brace 102. The movable guide push rods 103 move up and down throughout the bobbin 101 where the bobbin holes on top and bottom of the bobbin 101 are for the movable guide push rods 103 for up and down motion usually within an optimal tested range of 2 to 10 millimeters, determined by utilizing a Neodymium magnet strength of at least several thousand Gauss. The movable guide push rods 103 are permanently connected together at opposite ends by bottom brace 105 and bottom brace 105 also acts as a position bed for a disc axial poled magnet 107 but not limited to being a disc axial poled magnet, and include an axial poled magnet with its poles positioned axially up and down and parallel to the guide rods 103 are also another embodiment. The movable guide push rods 103 connected in stationary communication with top brace 102 and also connected in stationary communication with bottom brace 105 that permanently seats and holds axial poled magnet 107 so that all of those components move in unison with each other and the movable guide push rods 103 move when a downward force is applied to the top brace 102, and instantly when this action occurs axial poled magnet 107 breaks away from a magnetic metal core 106 disposed inside at the center of the coil of wire 104 that is wound on coil bobbin 101. FIG. 1 shows that the magnet 107 is in a "make" position, which is a rest position for the axial poled magnet 107 to be magnetically attracted to the magnetic metal core 106 that is stationary and disposed with the center of the coil bobbin 101.

Note: the tested successful parameters of the embodiments are with air gap distances of 2 to 10 millimeters using a coil with 200 turns or more of AWG Gauge #32 to #36 soft drawn enameled copper wire and using a rare earth magnet like Neodymium with a magnetic strength in a range of 2,000 to 8,000 Gauss typical. With the angular displacement embodiment typical tested angular displacement of a range of zero to 22.5 to 45 degrees.

Figure 2:
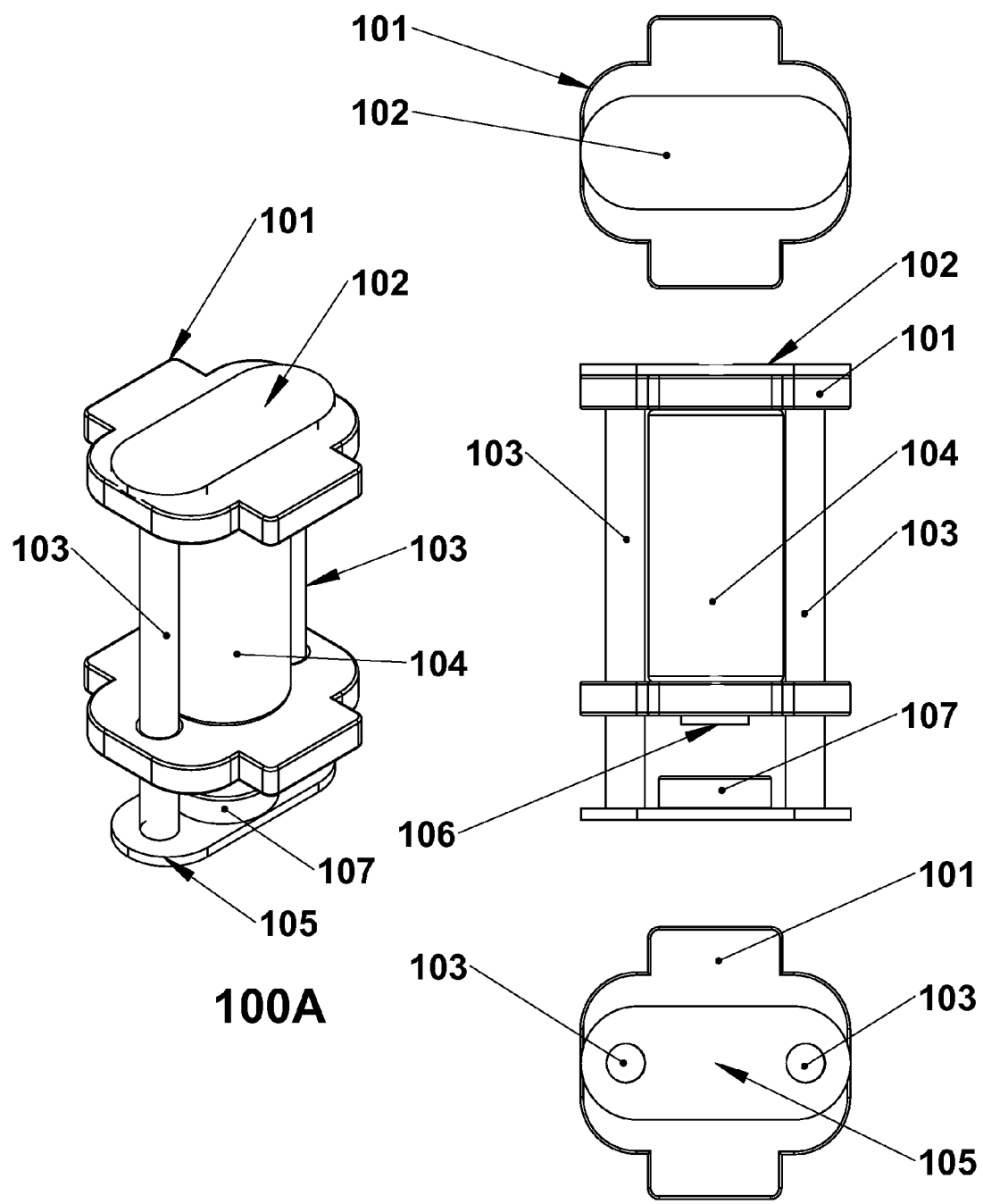
FIG. 2 is a drawing depicting the components of the first embodiment of the pulse push button energy harvesting generator invention, where the axially poled magnet is in vertical position "break-contact" with the hollow magnetic metal core.

In FIG. 2, 100A is an embodiment of the present invention with a coil bobbin embodiment 101 is made with holes to accommodate two parallel disposed movable guide push rods 103 that are connected together by top brace 102. The movable guide push rods 103 move up and down throughout the bobbin 101 where the bobbin holes on top and bottom of the bobbin 101 are the guides for up and down motion. The movable guide push rods 103 are permanently connected together at opposite ends by bottom brace 105 and bottom brace 105 also acts as a position bed for a disc axial poled magnet 107 but not limited to being a disc axial poled magnet, including a magnet with its poles positioned up and down and parallel to the movable guide push rods 103 are also another embodiment. The movable guide push rods 103 connected in stationary communication with top brace 102 and also connected in stationary communication with bottom brace 105 that permanently seats and holds axial poled magnet 107 so that all of those components move in unison with each other and the movable guide push rods 103 move when a downward force is applied to the top brace 102, and instantly when this action occurs axial poled magnet 107 breaks away from a magnetic metal core 106 disposed inside at the center of the coil of wire 104 that is wound on coil bobbin 101. FIG. 2 shows that the axial poled magnet 107 is in a "break" position, which is an instant action position for the axial poled magnet 107 that is forced away from magnetic metal core 106 by the downward force so that an air-gap (typical air gap of 2 to 10 millimeters) exists between axial poled magnet 107 and core 106. This action opens the closed magnetic circuit connection and instantly causes, by this action, the magnetic field that was contained within the core 106, to instantly expand throughout the coil wire 104 wound on coil bobbin 101 and further this instant action electromagnetically induces an electrical charge potential at the terminal ends of the coil winding 104. Further when the downward force instituted by something or someone is released, the air-gap substantially instantly diminishes to zero, which is the result of the axial poled magnet 107 still having a strong enough attraction with the air-gap to pull the magnet back to the magnetic metal core 106 so that the magnet is now back in a 'close contact' position that is reconnects the axial poled magnet 107 and core 106 and when this instant action occurs the axial poled magnet 107 connected back to the core 106 closed the magnetic circuit and the expanded magnetic field lines now collapses back in upon itself cutting the coil winding and producing an induced electrical charge potential at the terminal ends of the coil winding 104. This time the induced electrical charge potential is of opposite polarity of the 'open contact' episode.

Figure 3:
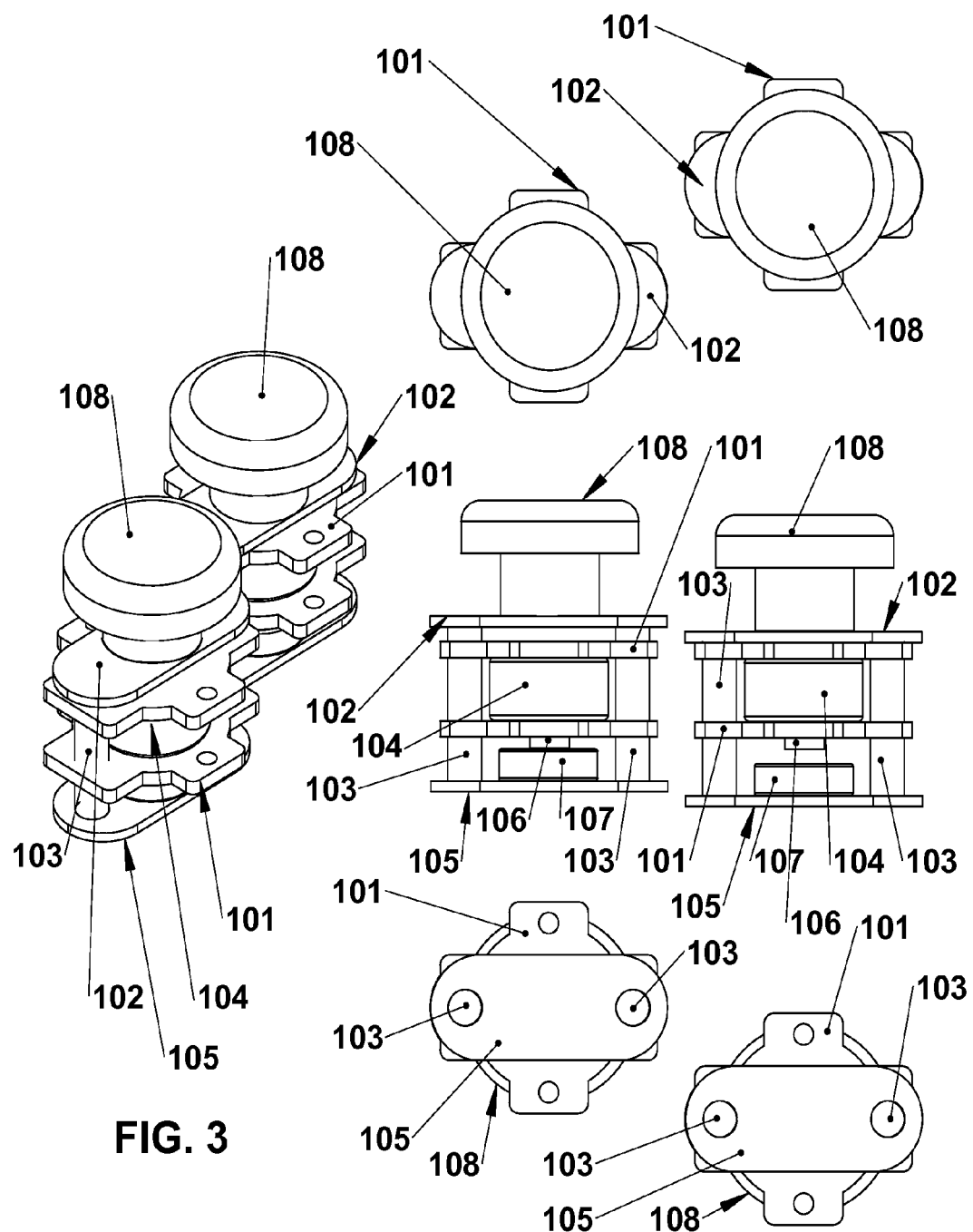
FIG. 3 is a drawing of and embodiment of two pulse push button energy harvesting generators showing vertical position close-contact and a substantially open-contact conditions, which both produce an electrical pulse.

In FIG. 3, the rest state, where no instant pulsed electrical energy is generated, of the viewed embodiment of the present invention illustrates push button 108 is disposed, connected to, and in communication with top brace 102 that is in communication with attached parallel round push rods 103 that are situated through two mirrored see-through guide holes that are part of coil bobbin 101. The two mirrored see-through holes are on opposite sides of the coil bobbin's flange wire stop walls. At right angles to the two mirrored see-through holes on both flange wire stop walls exists a set of mounting see-through holes for mounting stationary, the pulse generator to some type of utility enclosure (611 in FIG. 8) to dispose and enclose the energy harvesting generator embodiment of the present invention for any intended purpose.

In the Position Up state as illustrated in FIG. 3, there is the magnetic metal core 106 in magnetic and mechanical planar communication (magnetically stuck together) with axial poled magnet 107; and this condition causes a closed magnetic circuit between the magnetic metal core 106 and axial poled magnet 107 where there is dense magnetic field line concentration through the magnetic metal core and very few lines exist throughout the coil 104.

In the Position Down state as illustrated in FIG. 3, there is an instant break away of physical as well as direct magnetic contact and direct magnetic communication between the magnetic metal core 106 and axial poled magnet 107; and this condition causes an air gap (in a typical range of 2 to 10 millimeters) in the magnetic circuit between the magnetic metal core 106 and axial poled magnet 107, which is seen as an instant open magnetic circuit condition that represents high magnetic reluctance and where there is no longer a dense magnetic field line concentration through the magnetic metal core 106; and the magnetic lines of force instantly expand through the volume of the coil winding of the coil 104 and by Faraday's law of Electromagnetic Induction cut through the coil wire winding 104 and those the magnetic lines of force that are perpendicular to the coil wire 104 induce the instant maximum amount of induced electrical charge current. This action renders an instant electrical short time burst, measured in tens of milliseconds, pulse voltage felt at the terminal ends of the coil winding.

Figure 4:
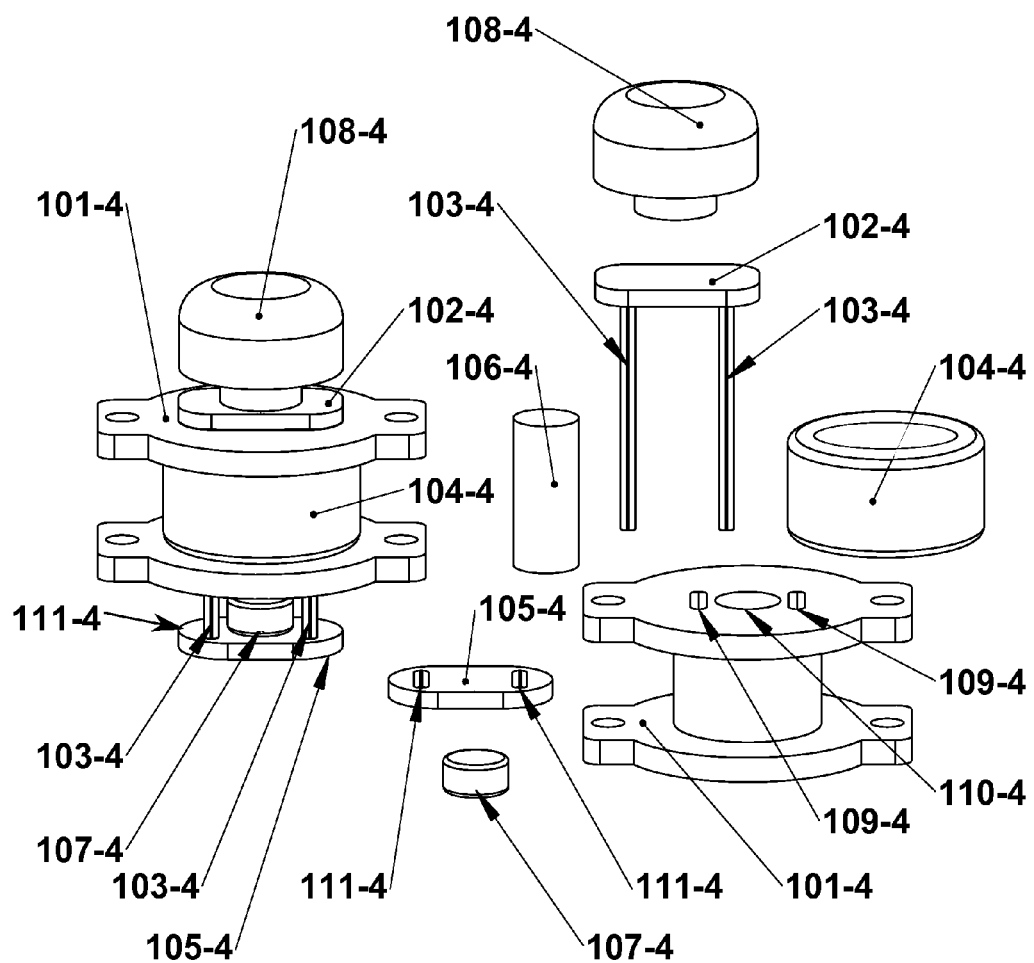
FIG. 4, is an exploded or breakaway view of the invention showing all novel components and a rectangular set of parallel push rods of the embodiment of FIG. 3.

FIG. 4, is an exploded illustration of an embodiment of the present invention that is a dual rectangular push rod push button energy harvesting generator configuration, whereby push button 108-4 is disposed and fixed stationary to 'up support brace' 102-4 that has disposed and fixed at right angles two parallel mirrored rectangular push rod members that pass through rectangular push rod guide see-through holes 109-4 and further the parallel mirrored rectangular push rods are disposed and connected fixed to "bottom magnet support brace" 105-4. Further magnetic metal core 106-4 is disposed and seated stationary within coil bobbin see-through hole 110-4 at the center of the coil bobbin 101-4 in such a method that positions the magnetic metal core to protrude out of the bottom of the coil bobbin 101-4 so that a millimeter fraction of the length of the magnetic metal core 106-4 can be at times in magnetic and planar physical touch or communication with axial poled magnet 107-4, this allows for an "eventual in-time" closed magnetic circuit that is a method means of concentrating the magnetic lines of force from the axial poled magnet's 107-4 magnetic pole to the magnetic metal core 106-4. This rest state of the pulse generator can be measured as a dense concentration of magnetic pole lines of force existing within the magnetic metal core 106-4 and a sparse concentration of axial poled magnet's 107-4 within the coil winding 104-4 that is wrapped around the coil bobbin 101-4.

Further in FIG. 4, the axial poled magnet 107-4 is seated stationary and is fixed permanently to 'bottom magnet support brace' 105-4, which is at its center. The action of applying a sufficient downward force on push button 108-4 causes simultaneously, in unison, all connected components of 'up support brace' 102-4, mirrored parallel rectangular push rods 103-4, 'bottom magnet support brace' 105-4, and axial poled magnet 107-4 to move downward and instantly opening physical and magnetic contact communication with the magnetic metal core 106-4 and this action causes the concentration of axial poled magnet's 107-4 magnetic lines of force to instantly expand outward from the magnetic metal core's volume and thereby cutting throughout the volume of the coil 104-4 and by Faraday's law of Electromagnetic Induction $$\text{emf} = -N\frac{d\varphi}{dt}$$

(Note: The minus sign is Lenz's Law)

inducing a voltage (a.k.a. electro motive force) (emf) that is felt as a voltage potential at the terminals of the coil 104-4. Since emf is inversely proportional to the change in time of this action, the faster the action of magnetic lines of force cutting perpendicular through a coil winding the greater the induced voltage is resultant. All of this action takes place as the axial poled magnet 107-4 is instantly separated from the magnetic metal core 106-4.

When an applied downward force on push button 108-4 is released the movement is designed to be limited so that there exists always enough attractive magnetic force between the axial poled magnet 107-4 and magnetic metal core 106-4 to attractively force the axial poled magnet to move back to the magnetic metal core and this action acts as a magnetic spring action. Thus the 'Push Down' and 'Pop Up' action of the embodiment will produce a pulse voltage of one polarity during the 'Push Down' time t1 and produce a pulse voltage of opposite polarity during the 'Pop Up' time t2.

Figure 5:
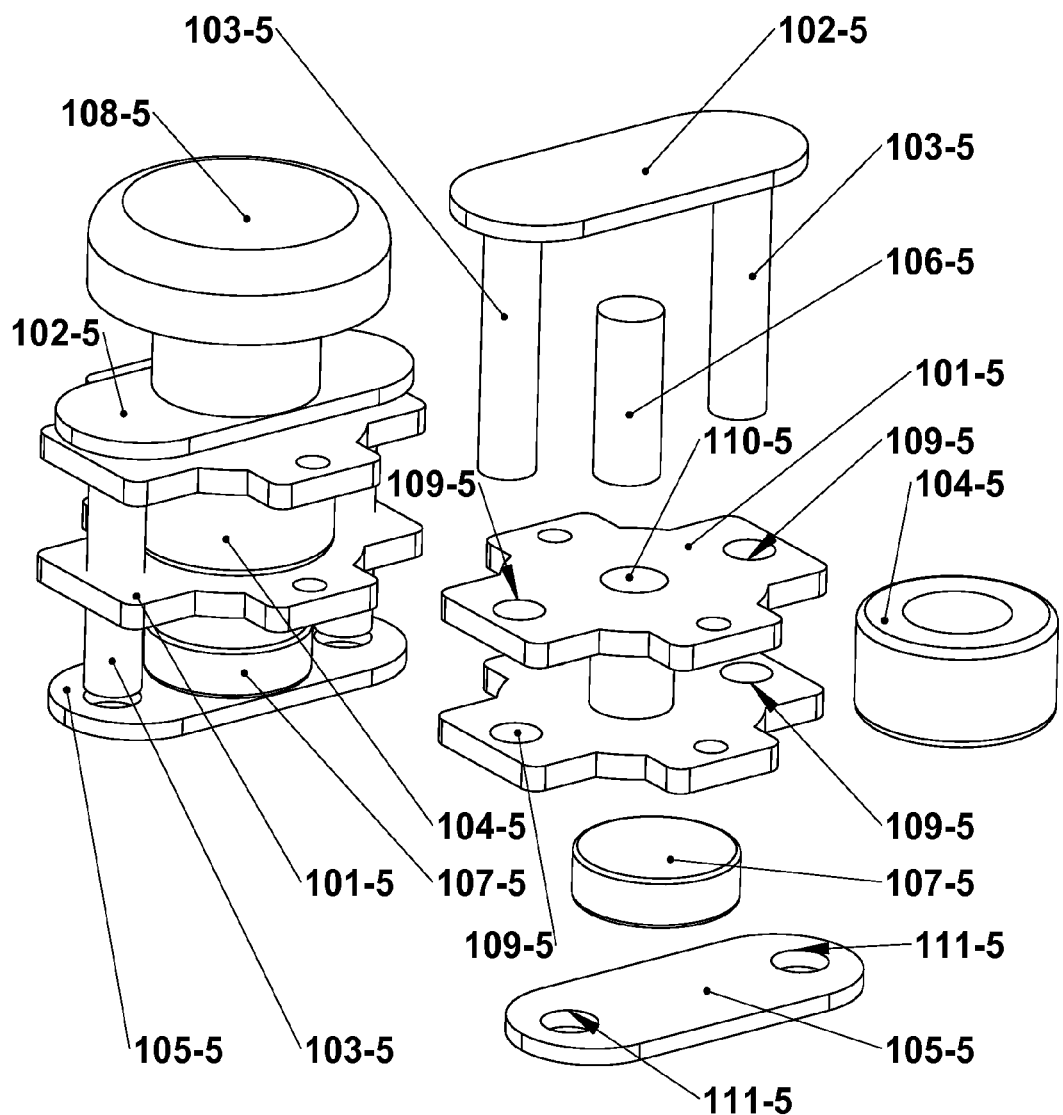
FIG. 5, is a different exploded view of the invention showing all components and a round set of parallel push rods of a further embodiment.

FIG. 5, is an illustration that see-through guide holes 109-5 on both ends of coil bobbin flanged walls for round mirrored parallel guide rods 103-5 and the bottom magnet brace 105-5 with its two mirrored round pus rod guide insert see-through holes 111-5 that the round push rod guides are any some method permanently inserted and fixed flush with the bottom pane of the bottom magnet brace 105-5.

FIG. 5, is an exploded illustration of an embodiment of the present invention that is a dual round push rod push button energy harvesting generator configuration, whereby push button 108-5 is disposed and fixed stationary to up support brace 102-5 that has disposed and fixed at right angles two parallel mirrored round push rod members that pass through round push rod guide see-through holes 109-5 and further the parallel mirrored round push rods are disposed and connected fixed to bottom magnet support brace 105-5. Further magnetic metal core 106-5 is disposed and seated stationary within coil bobbin see-through hole 110-5 at the center of the coil bobbin 101-5 in such a method that positions the magnetic metal core to protrude out of the bottom of the coil bobbin 101-5 so that a millimeter fraction of the length of the magnetic metal 330 core 106-5 can be at times in magnetic and planar physical touch or communication with axial poled magnet 107-5, this allows for an "eventual in-time" closed magnetic circuit that is a method of concentrating the magnetic lines of force from the axial poled magnet's 107-5 magnetic pole to the magnetic metal core 106-5. This rest state of the pulse generator can be measured as a dense concentration of magnetic pole lines of force existing within the magnetic metal core 106-5 and a sparse concentration of axial poled magnet's 107-5 within the coil winding 104-5 that is wrapped around the coil bobbin 101-5. Further in FIG. 5, the axial poled magnet 107-5 is seated stationary and is fixed permanently to bottom magnet support brace 105-5, which is at its center. The action of applying a sufficient downward force on push button 108-5 causes simultaneously, in unison, all connected components of up support brace 102-5, mirrored parallel round push rods 103-5, bottom magnet support brace 105-5, and axial poled magnet 107-5 to move downward and instantly breaking physical and magnetic contact communication with the magnetic metal core 106-5 and this action causes the concentration of axial poled magnet's 107-5 magnetic lines of force to instantly expand outward from the magnetic metal core's volume and thereby cutting throughout the volume of the coil 104-5 and by Faraday's law of Electromagnetic Induction $\text{emf} = -N\frac{d\varphi}{dt}$ (Note: The minus sign Lenz's Law) inducing a voltage (a.k.a. electro motive force (emt) that is felt as a voltage potential with a time duration of tens of milliseconds at the terminals of the coil 104-5. Since the induced voltage (emf) is inversely proportional to the change in time of this action, the faster action of magnetic lines of force cutting perpendicular through a coil winding the greater the induced voltage (emf) measured in volts is resultant. All of this action takes place as the axial poled magnet 107-5 is instantly separated from the magnetic metal core 106-5. When an applied downward force on push button 108-5 is released the movement is designed to be limited so that there exists always enough attractive magnetic force between the axial poled magnet 107-5 and magnetic metal core 106-5 to attractively force the axial poled magnet to move back to the magnetic metal core and this action acts as a magnetic spring action. Here, the 'Push Down' and 'Pop Up' action of the embodiment will produce a pulse voltage of one polarity with a typical time duration of tens of milliseconds during the 'Push Down' time t1 and produce a pulse voltage of opposite polarity with a typical time duration of tens of milliseconds during the 'Pop Up' time t2.

Figure 6:
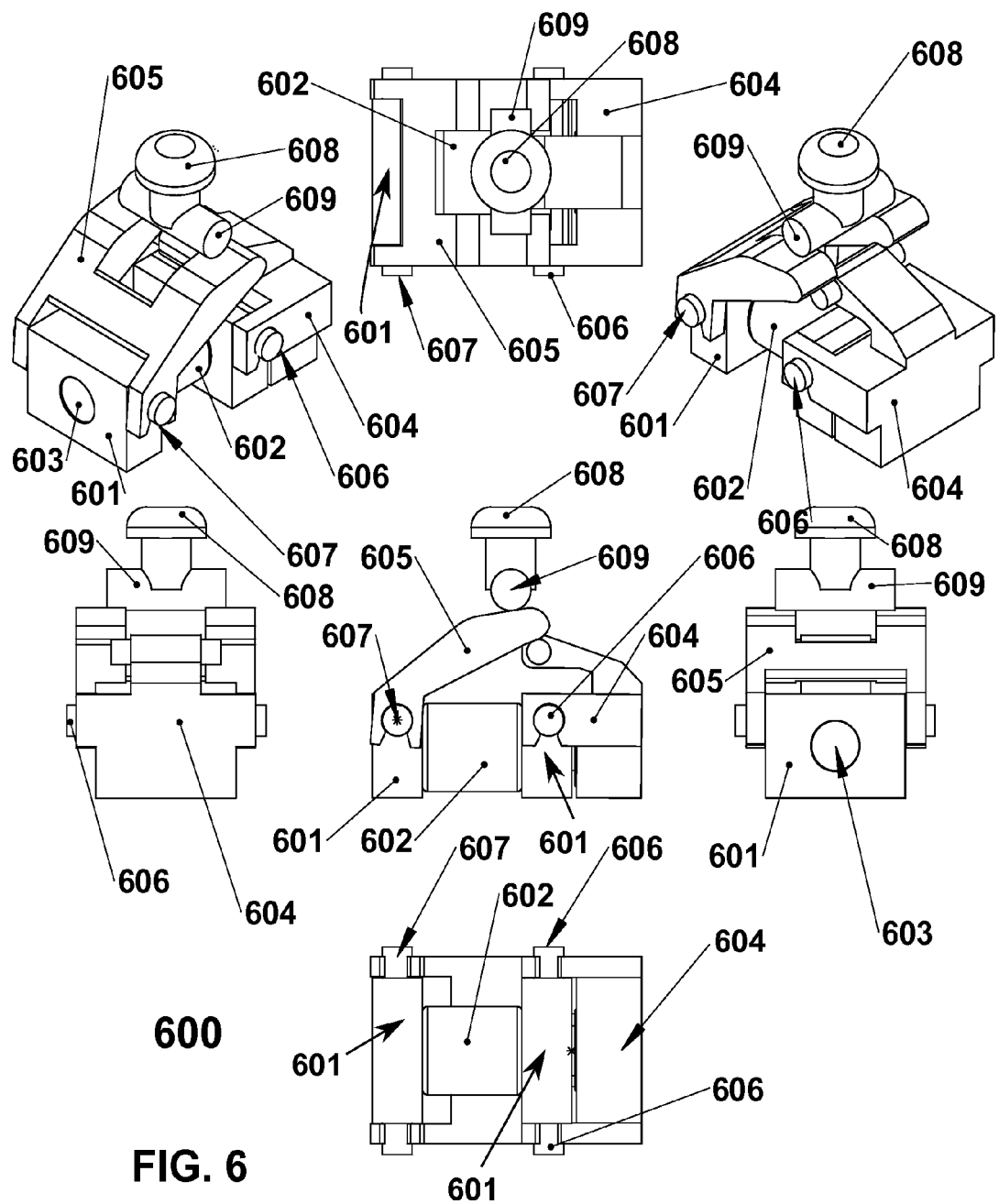
FIG. 6, is a further embodiment of a novel angular magnet movement, primary and secondary push down "snap on" magnetic spring latching system of one embodiment of the present invention.
Figure 8:
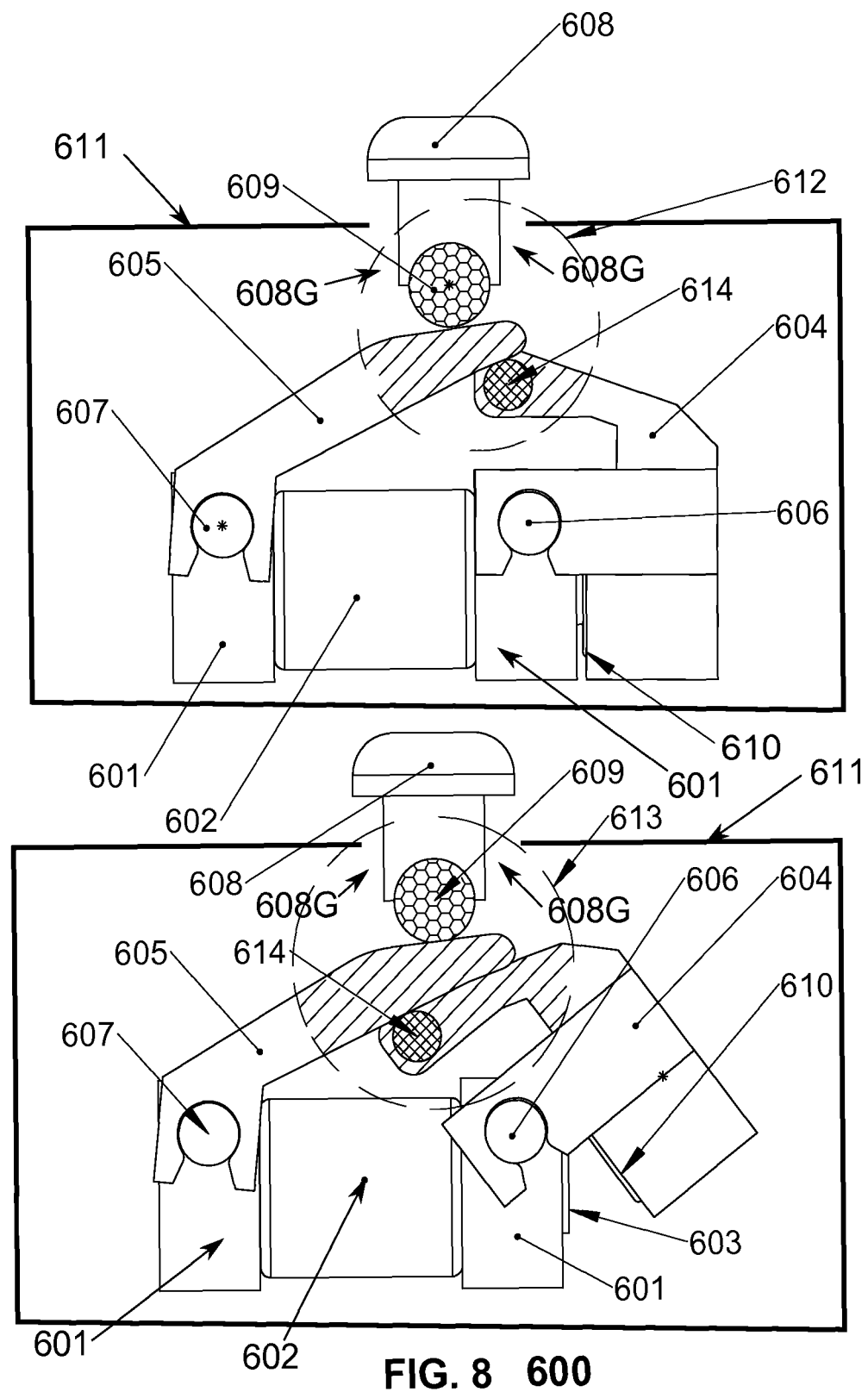
FIG. 8, is an action descriptive drawing of the angular latching sequence for the magnetic spring latching energy harvesting generator embodiment of FIG. 6 of the present invention.

FIG. 6, is a detailed illustration of a different embodiment 600 of the present invention's novelty, whereby a coil bobbin 601 is situated as a horizontal coil embodiment 601 that has disposed and movable about the axis of a first set of mirrored axial cylindrical protrusions 606 in the right plane against a top and front plane reference, a first removably mounted bi-directional movement magnetic latching enclosure bed 604 that seats and has fixed permanently an axial poled magnet (610 in FIG. 8). FIG. 6 also shows a second disposed and movable about the axis of a second set of mirrored axis cylindrical protrusions 607 in the right plane against a top and front plane reference, a removably mounted bi-directional movement dual cantilever angular fingered member 605 that is situated such that one end of the removably mounted bi-directional movement dual cantilever angular fingered member 605 is free to rotate about the axis of the second set of mirrored axis cylindrical protrusions 607 in the right plane against a top and front plane reference, and the opposite end of the removably mounted bi-directional movement dual cantilever angular fingered member 605 rests on a third set of mirrored axis cylindrical protrusions 609 in the right plane against a top and front plane reference that are disposed on the first removably mounted bi-directional movement magnetic latching enclosure bed's 604 neck type protrusion that rises in the top planar surface of the first removably mounted bi-directional movement magnetic latching enclosure bed 604 and is disposed to be in contact target of the removably mounted bi-directional movement dual cantilever angular fingered member 605 to be pushed down as the removably mounted bi-directional movement dual cantilever angular fingered member 605 is pushed downward by push button plunger 608 that has a fourth set of mirrored axis cylindrical protrusions 609 in the right plane against a top and front plane reference that is in contact mechanical communication with the removably mounted bi-directional movement dual cantilever angular fingered member 605.

Figure 7:
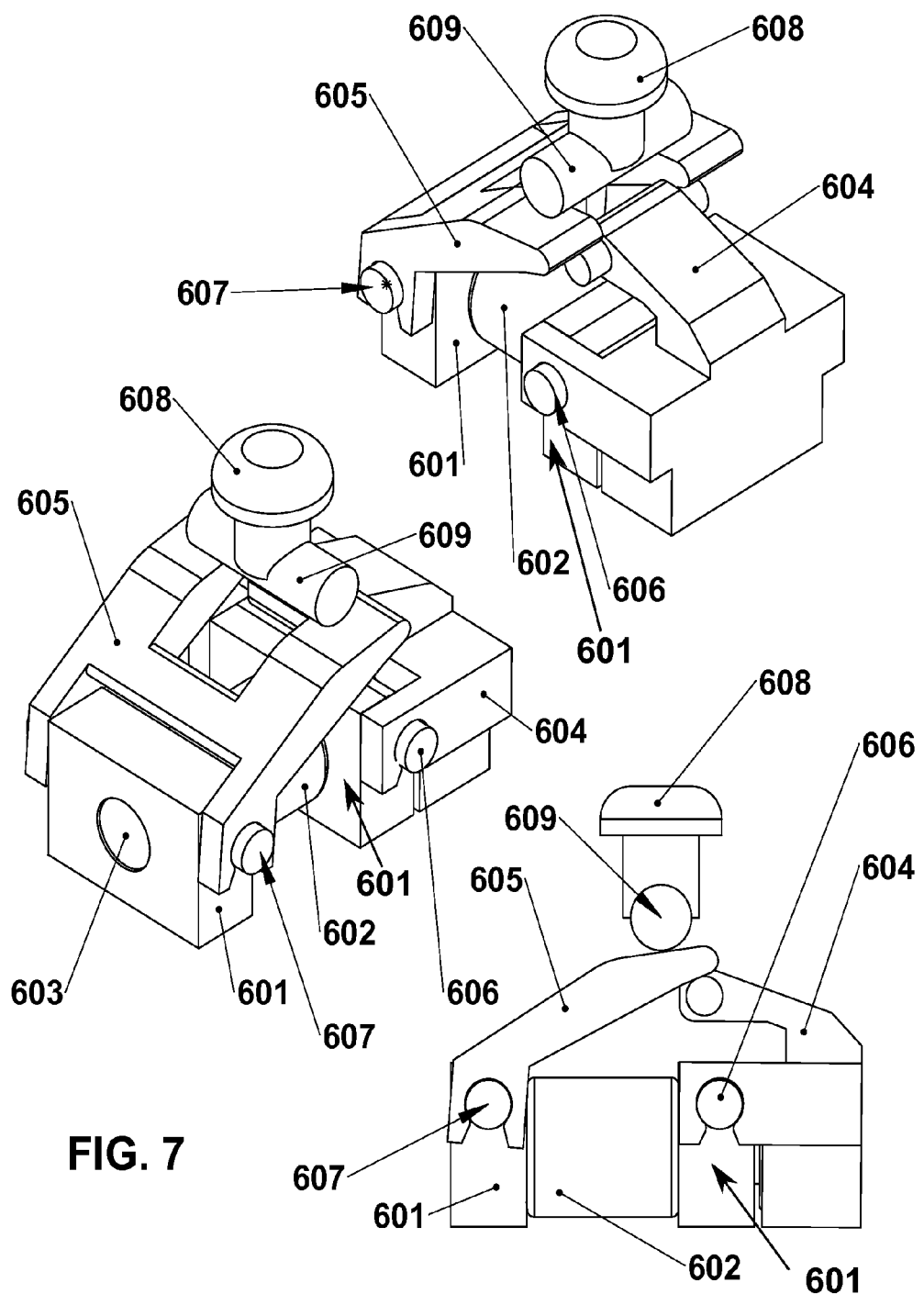
FIG. 7, is another perspective tri-view of a magnetic spring latching energy harvesting generator embodiment of FIG. 6 of the present invention.

FIG. 7, is a larger view of novel embodiment 600 of the present invention that shows the magnetic metal core 603 that is disposed through the see through hole of the coil bobbin 601 and protrudes out of the opposite end of the visible opening shown in FIG. 7. This protrusion sticks out by 0.5 millimeters (0.5 millimeters or less, but greater than zero millimeters; enough of a volume of protrusion to guarantee that the hollow magnetic metal core and the axial poled magnet will at time come in and out of contact with each other), just enough to be available for the action of the exposed pole of the axial poled magnet (610 in FIG. 8) that is permanently fixed within the blind hole of the first removably mounted bi-directional movement non-magnetic magnet latching enclosure bed 604 to instantly come in magnetic and mechanical contact with the magnetic metal core by angular movement so its action will produce a voltage pulse in the coil 602 on impact contact that completes a magnetic circuit to concentrate the magnetic lines of force in the magnetic metal core 603 and by doing so cause the magnetic field to collapse around the coil winding 602 volume of wire turns, inducing a pulse of voltage (emf).

In FIG. 8, the focus is on the novel embodiment 600 of the present invention, whereby two illustrative circles of focus 612 & 613 shows in the top circle of interest 612 of FIG. 8 the normal pre-engaged rest status of operation of the embodiment. In this instance there is no voltage output at the terminals of the coil 602 wound on a horizontal coil bobbin 601. Then at any time in future from this point when the push button plunger 608 with its set of mirrored-on-axis cylindrical protrusions 609 that is in mechanical communication with the removably mounted bi-directional movement dual cantilever angular fingered member 605 is forced downward through the enclosure 611 guides 608G, the region of the plunger protrusions 609 (shown as a honey-combed filled region) opposite of the rotating section of the removably mounted bi-directional movement dual cantilever angular fingered member 605 instantly moves the removably mounted bidirectional movement dual cantilever angular fingered member 605 downward forcing the fingered section of the cantilever (shown as the hatched region in the circle) to contact the circular horizontal protrusion 614 emanating from the neck section of the first removably mounted bi-directional movement magnetic latching enclosure bed 604 and whose resultant sequential movement rotates the first removably mounted bi-directional movement non-magnetic magnet latching enclosure bed 604 that contains the axial poled magnet 610 and by this movement that is angular and upward around the first protruded axle 606 this movement disengages, at a displaced angle, the planar surface magnetic contact between the core 603 and the magnet 610 and it is during this substantially instant in time open from contact that a voltage pulse of tens of milliseconds is generated at the coil 602 winding terminals. This is illustrated in the bottom circle of interest 613. Shown in the bottom circle 613 at a time when a force pushing downward on the plunger 608 is released then in another instant in time all of the stated action sequencing reverses instantly due to the residual lingering magnetic attraction between the stationary magnetic metal core 603 and the axial poled magnet 610. When this reverse angular movement concludes by the axial poled magnet 610 hammering the stationary magnetic metal core 603, at that 465 instant a voltage pulse of tens of milliseconds is generated at the coil 602 winding terminals. In reverse sequential order: (1) Axial poled magnet 610 moves downward by magnetic attraction to magnetic metal core 603 and a strong pulling force hammers the axial poled magnet 610 to the magnetic metal core 603 instantly causing the surrounding magnetic field of axial poled magnet 610 to collapse around and through the coil windings of coil 602 and back into the magnetic metal core 603 that has a high magnetic permeability compared to air and the copper wire of the coil windings of coil 602 and this action causes an induced pulse of voltage lasting tens of milliseconds to be felt at the terminals of the coil 602. (2) As the rotating first removably mounted bi-directional movement non-magnetic magnet latching enclosure bed 604 abuts the end of the horizontal coil bobbin 601 it stops, and (3) simultaneously during this action the circular horizontal protrusion 614 emanating from the neck section of the first removably mounted bi-directional movement non-magnetic magnet latching enclosure bed 604 rises up to its initial rest position as is shown in top circle of interest 612, and this action simultaneously pushes on the removably mounted dual cantilever angular fingered member 605 that is in contact with the mirrored-on-axis cylindrical protrusions 609 and as the removably mounted dual cantilever angular fingered member 605 rotates upward by its bottom section rotating about the coil bobbin second mirrored-on-axis protrusions 607 the opposite end pushes upon the dual protrusion section 609 of the push button plunger 608 through push button guides 608G that is part of the enclosure 611 and the push button plunger 608 then comes to rest until the next push.

Figure 9:
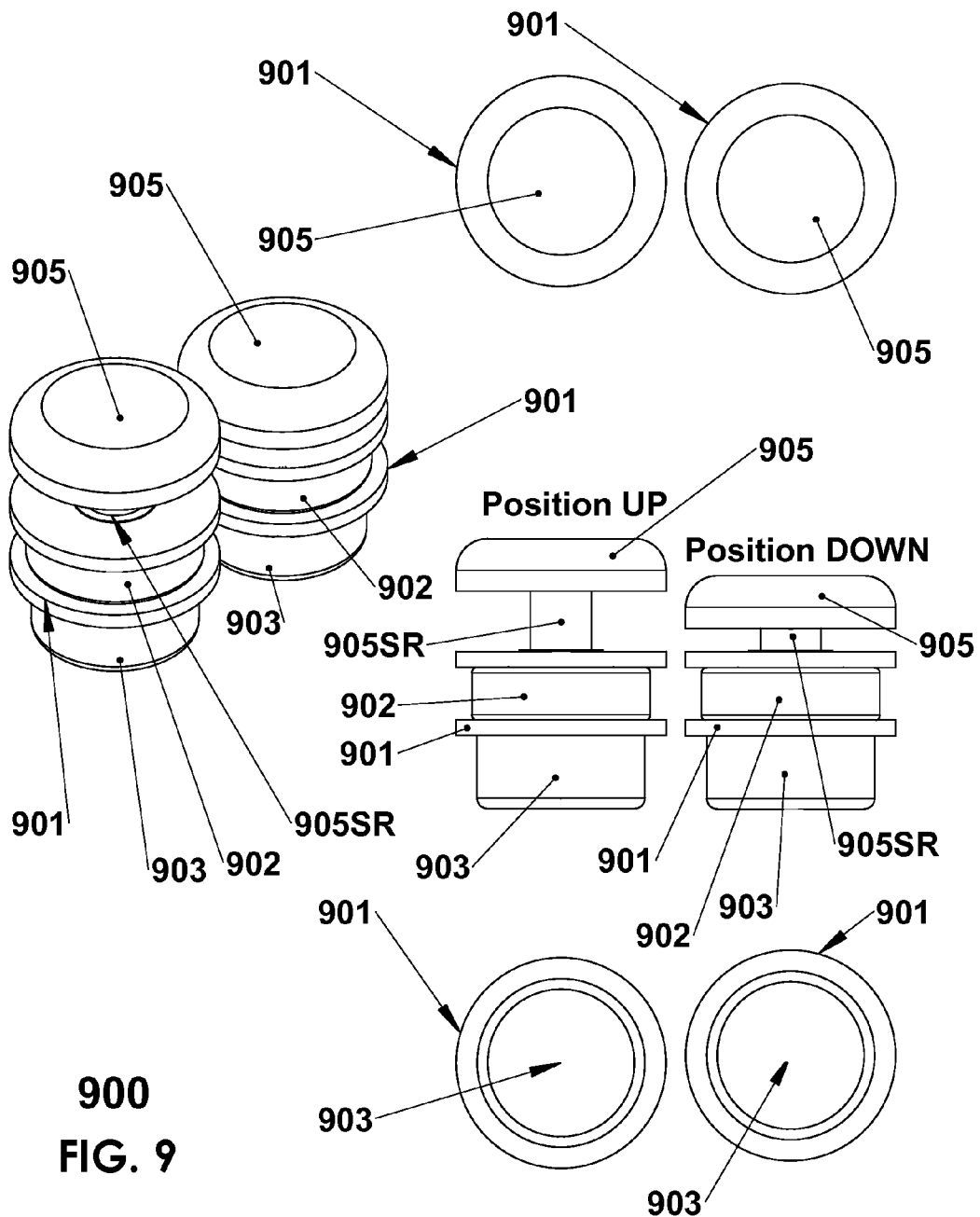
FIG. 9, is a drawing showing the position up and position down of the single non-metallic or non-magnetic metal push rod and a hollow magnetic metal core embodiment of FIG. 6 of the present invention.

FIG. 9 illustrates in several views 900, the Position UP rest condition of the present invention embodiment that is a no voltage output from the coil of wire 902 that is wound on coil bobbin 901. When push button plunger 905 is pushed down, its' disposed stem rod 905SR moves through the center of the horizontal coil bobbin 901 and disconnects the axial poled magnet (107-5 in FIG. 5) from the hollow magnetic metal core (906 in FIG. 10) seated fixed within the center see-through hole of coil bobbin 901 and it is during this instant action that a pulse of voltage (emf) is felt at the coil of wire 902.

The spring-like action during the time the push button 905 and its' disposed stem rod 905SR are in the first instance 'push-down' phase that generates a voltage pulse of one polarity and during the time the push button 905 and its' disposed stem rod 905SR are in its second instance 'pop-up' phase that generates a voltage pulse of opposite polarity relative to the first instance, is caused by the axial poled magnet being attracted to the hollow magnetic metal core even when they are displaced at a small distance from each other that is in an effective range of zero millimeters to 10 millimeters in a typical embodiment, determined by using an axial poled Neodymium magnet having a magnetic field strength of several thousand gauss minimum, where zero millimeters is magnetic and physical contact between the axial poled magnet (907 in FIG. 10) and hollow magnetic metal core (906 in FIG. 10) due to the influencing attractive magnetic force field and this is felt as a spring-like force.

FIG. 9 also illustrates in several views 900, the Position DOWN momentary rest condition, momentary until the push down force is released so the push button 905 can pop back up to its steady state rest condition, by magnetic attraction, until the next push force is applied.

Figure 10:
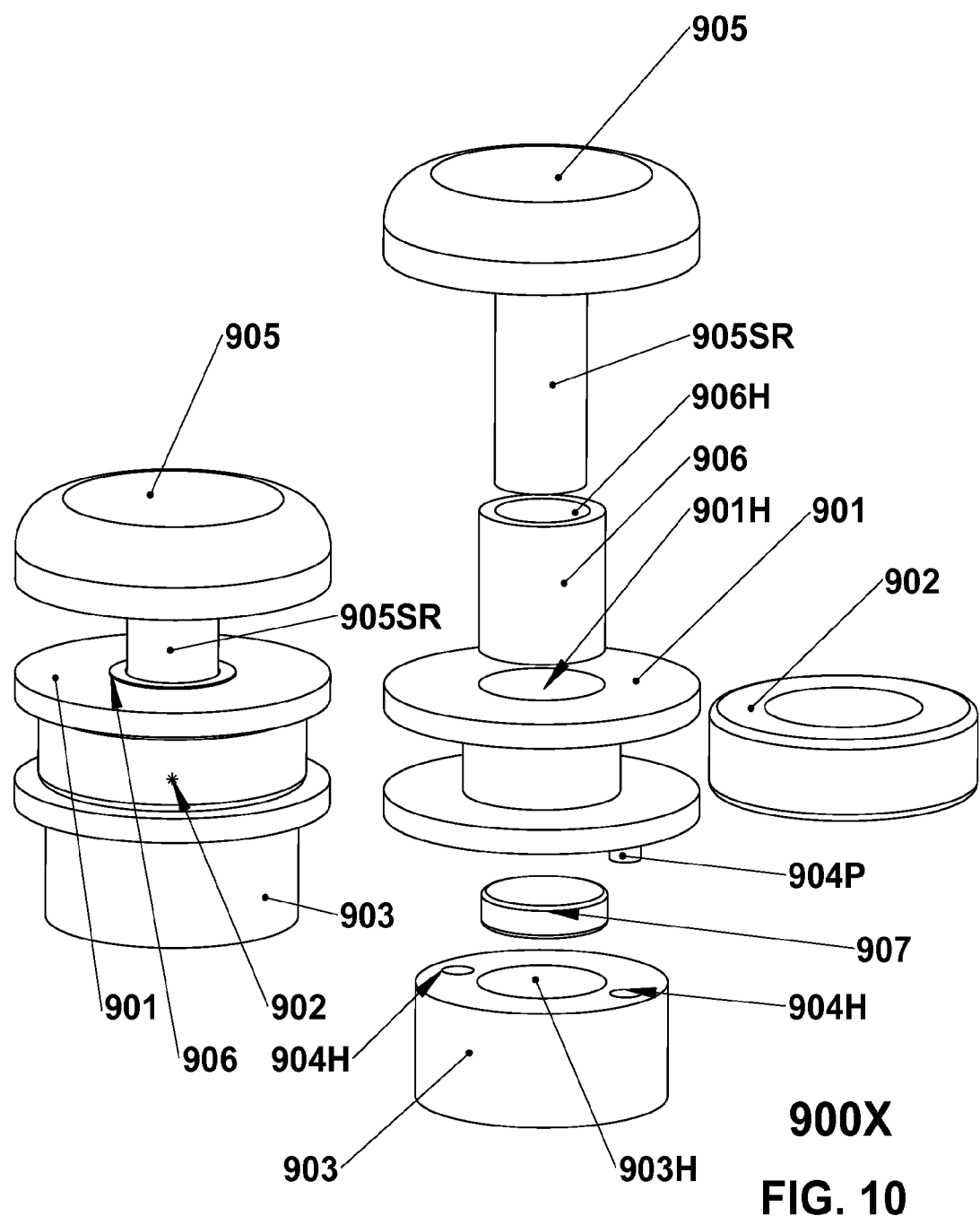
FIG. 10, is an exploded view of the position up and position down of the single non-metallic or non-magnetic metal push rod and "hollow" magnetic metal, but not limited to a hollow core," embodiment of the present invention.
Figure 11:
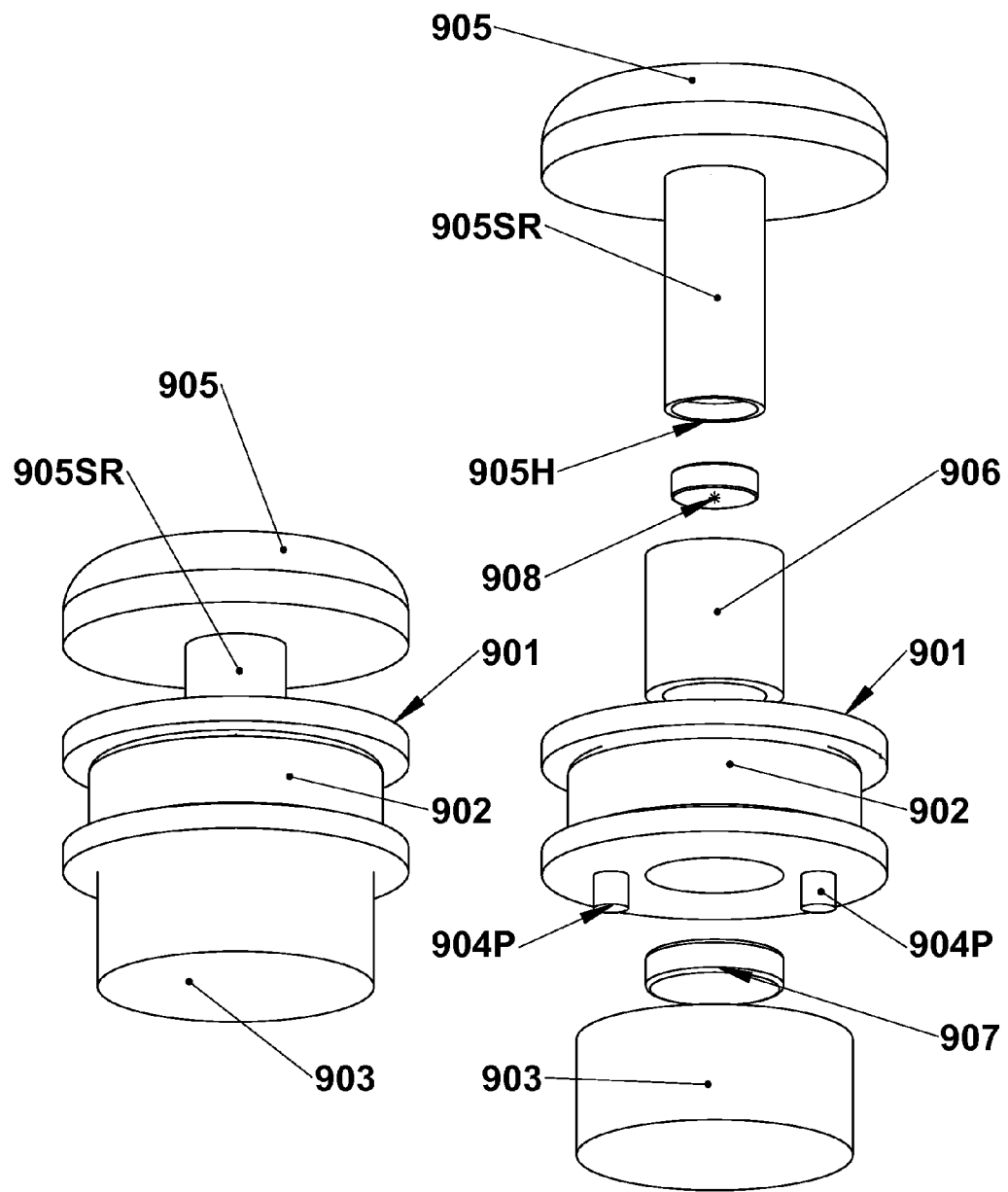
FIG. 11, is an exploded view of the position up and position down of the single (non-metallic or non-magnetic metal) push rod and hollow magnetic core embodiment of FIG. 9 of the present invention that further utilizes a small pilot magnet to magnetically attach the push rod to the movable axial poled magnet.

FIG. 10, is an exploded view 900X of an embodiment of the present invention that specifically utilizes a hollow magnetic metal core 906 that is disposed and fixed within the center see-through hole 901H of coil bobbin 901 having an open tubular center between two ends about which the wire coil 902 is wound, and a wall extending radially outward perpendicular from each end of the tubular center, and the hollow magnetic metal core 906 is being flush with at least one end of the walls and protrudes (0.5 millimeters or less, but greater than zero millimeters; enough of a volume of protrusion to guarantee that the hollow magnetic metal core and the axial poled magnet will at time come in and out of contact with each other) out of the other end of the coil bobbin 901 so that it can, at times, be in direct communication with the movable axial poled magnet 907 that is movable within the blind hole 903H of the bottom magnet 490 enclosure 903 that is locked into a fixed position by locking pins 904P (904P in FIG. 11). This blind hole 903H disposed in the top surface plane of bottom magnet enclosure 903 is the movable path that the movable axial poled magnet 907 takes during the push button 905 'push-down' phase and during the 'pop-up phase' that occurs during the push down phase and spring back phase of the push button plunger 905 and push 495 button stem rod 905SR and during these two phases of operation, the pulses of opposite polarity voltages (Positive and Negative emf in FIG. 12) are generated in the coil windings of coil 902, each pulse having a time duration in tens of milliseconds typical.

FIG. 11 is an illustration view of another embodiment of the present invention that specifically utilizes a hollow magnetic metal core 906 that is disposed and fixed within the center see-through hole 901H of flanged walled coil bobbin 901 and the hollow magnetic metal core 906 protrudes (0.5 millimeters or less, but greater than zero millimeters; 0.5 millimeters or less, but greater than zero millimeters; enough of a volume of protrusion to guarantee that the hollow magnetic metal core and the axial poled magnet will at time come in and out of bobbin 901 so that it can, at times, be in direct communication with the movable axial poled magnet 907 that is movable within the blind hole 903H of the bottom magnet enclosure 903 that is locked into a fixed position by locking pins 904P. This blind hole 903H disposed in the top surface plane of bottom magnet enclosure 903 is the movable path that the movable axial poled magnet 907 takes during the push button 905 'push-down' phase and during the 'pop-up phase' that occurs during the push down phase and spring back phase of the push button plunger 905 and push button stem rod 905SR and during these two phases of operation, the pulses of opposite polarity voltages (shown in FIG. 12) are generated in the coil windings of coil 902, each pulse having a time duration in tens of milliseconds typical. In this illustrated angular perspective view of FIG. 11, there exists, in this embodiment, an axial poled pilot magnet 908 that is inserted and fixed into place within the blind hole 905H at the bottom of the preferably non-magnetic stem rod 905SR disposed on push button 905. The axial poled pilot magnet 908 has physical volume dimensions less than that of the movable axial poled magnet 907 and the axial poled pilot magnet 908 is utilized to strongly attach and to be held in place, by attractive magnetic communication, with the movable axial poled magnet 907; Operation sequencing to generate electrical pulses progresses as; (1) the push button 905 and its stem rod 905SR move simultaneously by an external applied downward force; and (2) so does the pilot magnet 908 and the movable axial poled magnet 907 move simultaneously down and up, with the push button 905 and its stem rod 905SR they move through the hollow magnetic metal core 906; and at the other end of the pushbutton stem rod 905SR that has the axial poled pilot magnet 908 attached, it moves simultaneously by magnetic field opposite pole attractive communication with the axial poled magnet 908 down and up (a range of zero millimeters to 10 millimeters, where zero being actual contact) within the blind hole well of bottom magnet enclosure 903; (3) when the axial poled magnet 907 disconnects itself as a result of an applied downward external force there exists an open magnetic circuit condition between the hollow magnetic metal core 906 and the movable axial poled magnet 907 whereby the magnetic field, of the axial poled magnet 907, that was contained within the cylindrical wall of the hollow magnetic metal core 906 now expands throughout the coil windings of the coil 902 thus generating a pulse of a polarity voltage of tens of milliseconds at the coil 903 terminals; (4) when an external downward force (Push Down Force FIG. 12) is released from the push button 905, a reversing 'pop-up' effect occurs due to a residual continuous influencing mutual attractive magnetic field communication between the axial pole magnet 907 and the hollow magnetic metal core 906 (that is at some distance greater than zero millimeters and less than or equal to some finite distance in units of millimeter values that is determined by the strength of the magnet); where the magnetic field continues to mutually attract the movable axial poled magnet 907 and the hollow magnetic metal core 906 to each other, this mutual attractive magnetic force instant spring-back upward movement the axial poled magnet 907 and it abuts the hollow magnetic metal core 906 and this instantly collapses the expanded magnetic field of the axial pole magnet 907 from around the volume of the coil 902 winding and the magnetic field, of the axial poled magnet 907, is now concentrated within the high permeability hollow magnetic metal 906 cylindrical wall volume and; this generates a pulse of opposite polarity (relative to the push down phase) voltage of tens of milliseconds at the coil 903 terminals.

Figure 12:
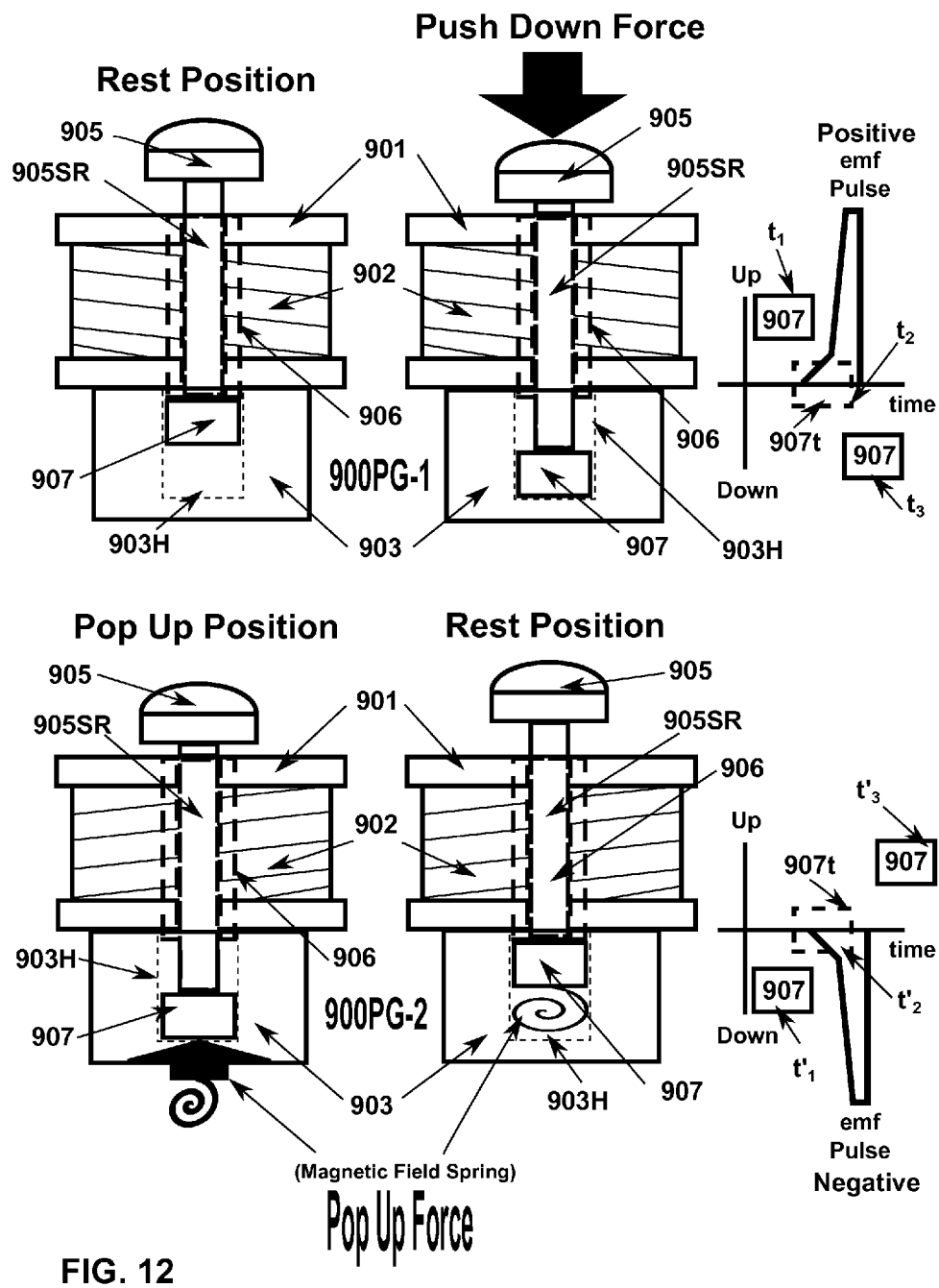
FIG. 12 is an illustration of a single push rod embodiment of the present invention showing the corresponding voltage pulses produced relative to linear push-down and pop-up displacement magnet travel in accordance with Faraday's Law of Electromagnetic induction.

FIG. 12 illustrates the comparison of the Rest Position (a no voltage pulse condition), the Push-Down Force condition in time (Positive voltage pulse generation), and the Pop-Up Force Position (Negative voltage pulse generation) condition in time for one of the embodiments of the present invention. The top compared embodiments of the present invention 900PG-1 in FIG. 12 shows the down thrust of magnet 907 by applied external kinetic Push Down Force on push button 905 causing a Positive Voltage Pulse that is felt at the coil 902 winding terminals. There is a time transition of $t_1$, $t_2$, and $t_3$ where the axial poled magnet 907 travels from time $t_1$, the rest start point of the axial pole magnet 907, when it "breaks away" from the hollow magnetic metal core 906, to its transitional time $t_2$ to $t_3$ when it is traveling downward through the blind-hole well 903H of bottom enclosure 903, and time $t_3$, which is the bottom stop destination of the blind-hole well 903H. It is during time period $t_1$ that the induced Positive voltage pulse is produced at the terminals of the coil 902 winding. The bottom compared embodiments of the present invention 900PG-2 of FIG. 12 shows the Pop-Up Position thrust kinetic force that is established by the mutual attractive magnetic force between the axial poled magnet 907 and the hollow magnetic metal core 906 that force the axial poled magnet 907 to strike and be in mechanical and magnetic communication with the hollow magnetic metal core 906. There is a time transition where of $t'_1$, $t'_2$, and $t'_3$; where the axial poled magnet 907 travels during time $t'_1$, from the momentary return rest point at the "bottom of the blind-hole well 903" to when it is traveling upward through the blind-hole well 903H of bottom enclosure 903 that is its transitional phase $t'_2$ to $t'_3$, and time $t'_3$, which is the "magnet to core" strike stop destination of the blind-hole well 903H. It is during time period $t_3$ that the induced Negative voltage pulse is produced at the terminals of the coil 902 winding.

Figure 13:
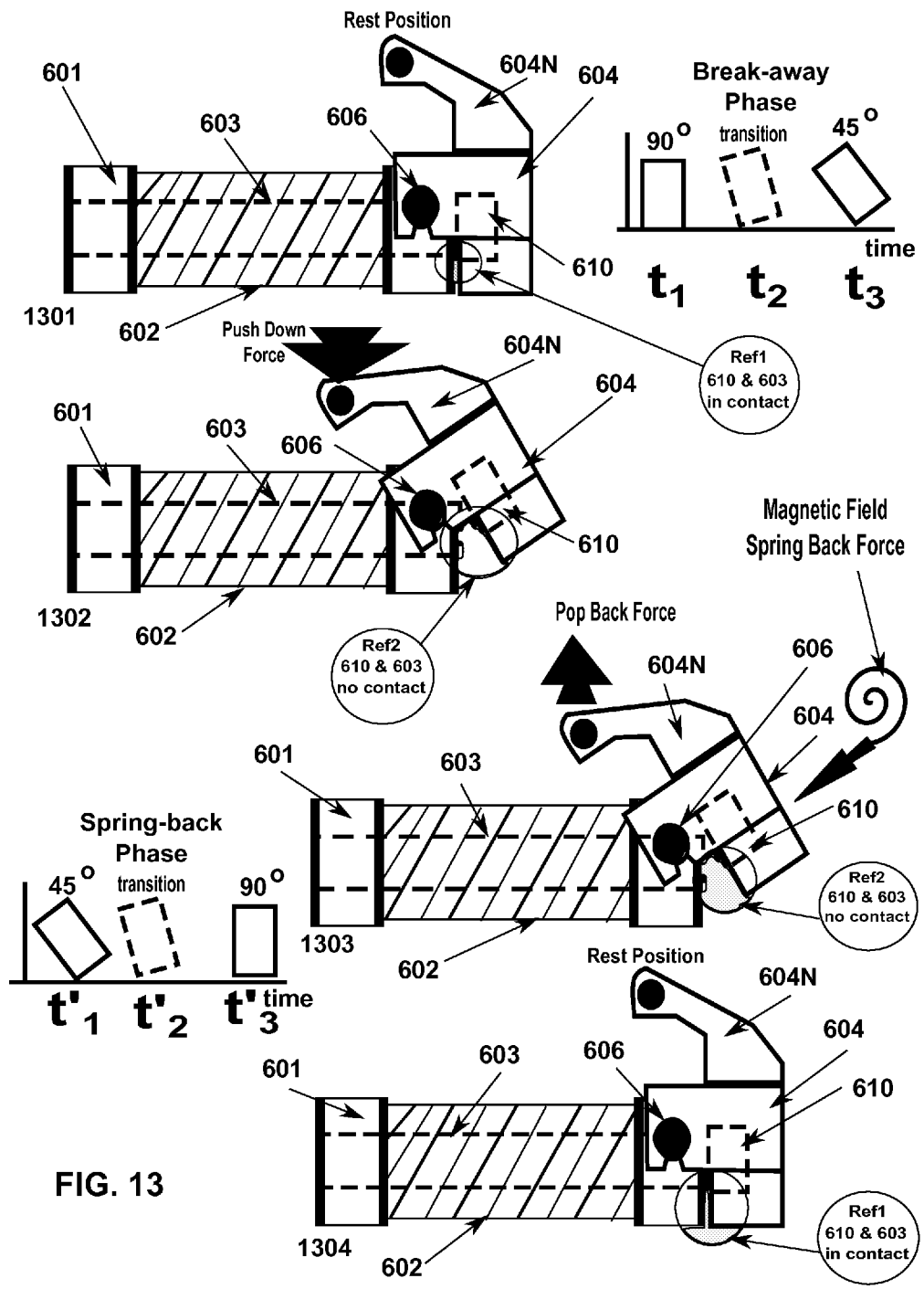
FIG. 13 is an illustration of a horizontal coil bobbin embodiment showing resultant angular travel displacement translation of the magnet due to primary linear push-down and pop-up applied force that enables voltage pulses to be produced in accordance with Faraday's Law.

FIG. 13 shows the minimal basic transitional operation time views 1300 of another embodiment of the present invention that utilizes a horizontal coil bobbin 601 with a centered see-through hole that has disposed and fixed, a solid or hollow magnetic metal core 603 that is fitted flush with the coil bobbin 601 see-through hole 603 on one end and a protruded exit that is less than or equal to 0.5 millimeters (0.5 millimeters or less, but greater than zero millimeters; enough of a volume of protrusion to guarantee that the hollow magnetic metal core and the axial poled magnet will at time come in and out of contact with each other) on the opposite end of the coil bobbin see-through hole 603, so it can periodically come in magnetic and mechanical contact communication with the axial pole magnet 610. Drawing section 1301 illustrates the rest state of the embodiment where the rotating, about the coil bobbin cylindrical protrusion 606, removably mounted bidirectional movement magnetic latching enclosure bed 604 is at rest and at a right angle relative to the horizontal plane of the coil bobbin 601; and the axial poled magnet 610 that is disposed and fixed in the blind hole well of the bi-directional movement magnetic latching enclosure bed 604, so that both the removably mounted magnet bed 604 and the magnet 610 bi-directionally rotate and move simultaneously around the coil bobbin cylindrical protrusion 606. At this time of $t_1$, the axial pole magnet 610 disposed and fixed within the blind-hole well of the removably mounted bi-directional movement magnetic latching enclosure bed 604, is at rest at 90° and is in magnetic and mechanical communication with the hollow core 603, but not limited to a hollow core. During this rest state no pulse voltage is produced, since according to Faraday's law of Electromagnetic Induction there must be movement. Ref1 shows the magnet 610 and hollow core 603 in contact.

Drawing section 1302 illustrates the transitional time period $t_2$ to $t_3$, when a Push Down Force is applied to the neck extension member 604N of the removably mounted bi-directional movement magnetic latching enclosure bed 604; and as this transitional time period $t_2$ to $t_3$ occurs simultaneously; the neck extension, the removably mounted bi-directional movement magnetic latching enclosure bed 604, and the disposed and fixed axial pole magnet 610 rotate and move at an angle about coil bobbin cylindrical protrusion 606. During this instant in time $t_2$, the axial poled magnet 610 "magnetically and mechanically disconnects," at an increasing angular displacement up to 45°, determined by using an axial poled Neodymium magnet having a magnetic field strength of several thousand gauss minimum, from being in magnetic and mechanical contact communication with the hollow magnetic metal core 603; and it is during this transitional time period $t_2$ to $t_3$ that a Positive voltage pulse is generated by Faraday's law of Electromagnetic Induction, at the coil winding terminals of coil 602. After time $t_3$ is reached and all movement instantly stops, no pulse voltage is felt at the coil 603 winding terminals, in accordance with Faraday's law.

When an applied external Push Down Force is released as illustrated in 1303 of FIG. 13, an instant Pop Back Force is created by the residual mutually attractive magnetic field force existing between the hollow magnetic metal core 603 and the axial poled magnet 610. This residual mutually attractive magnetic field force existing between the hollow magnetic metal core 603 and the axial poled magnet 610 is converted into kinetic energy in the system that causes simultaneously, a reverse rotational movement (relative to 1302 in FIG. 12) centered around the horizontal axis of the coil bobbin cylindrical protrusion during the transitional time period of $t_2$ to $t_3$, and this reverse rotational movement from 45° to 0° when 0° is reached the axial poled magnet "close contacts" the hollow magnetic metal core; and this abrupt change of the hollow magnetic metal core 603 and the axial poled magnet 610 being back in magnetic and mechanical contact communication with each other causes the magnetic field of axial poled magnet 610 that was expanded throughout the coil winding of coil 602 to suddenly collapse into the hollow magnetic metal core 603 wall (Ref1 610 & 603 in contact); and it is during this transitional time period $t_2$ to $t_3$ that a Negative voltage pulse is generated, by Faraday's law of Electromagnetic Induction, at the coil winding terminals of coil 602. When this instance in time $t_3$ transpires, illustration 1304 is shown as the returned to Rest Position of the embodiment where there again is no pulse voltage felt at the coil 602 winding terminals.

Figure 14:
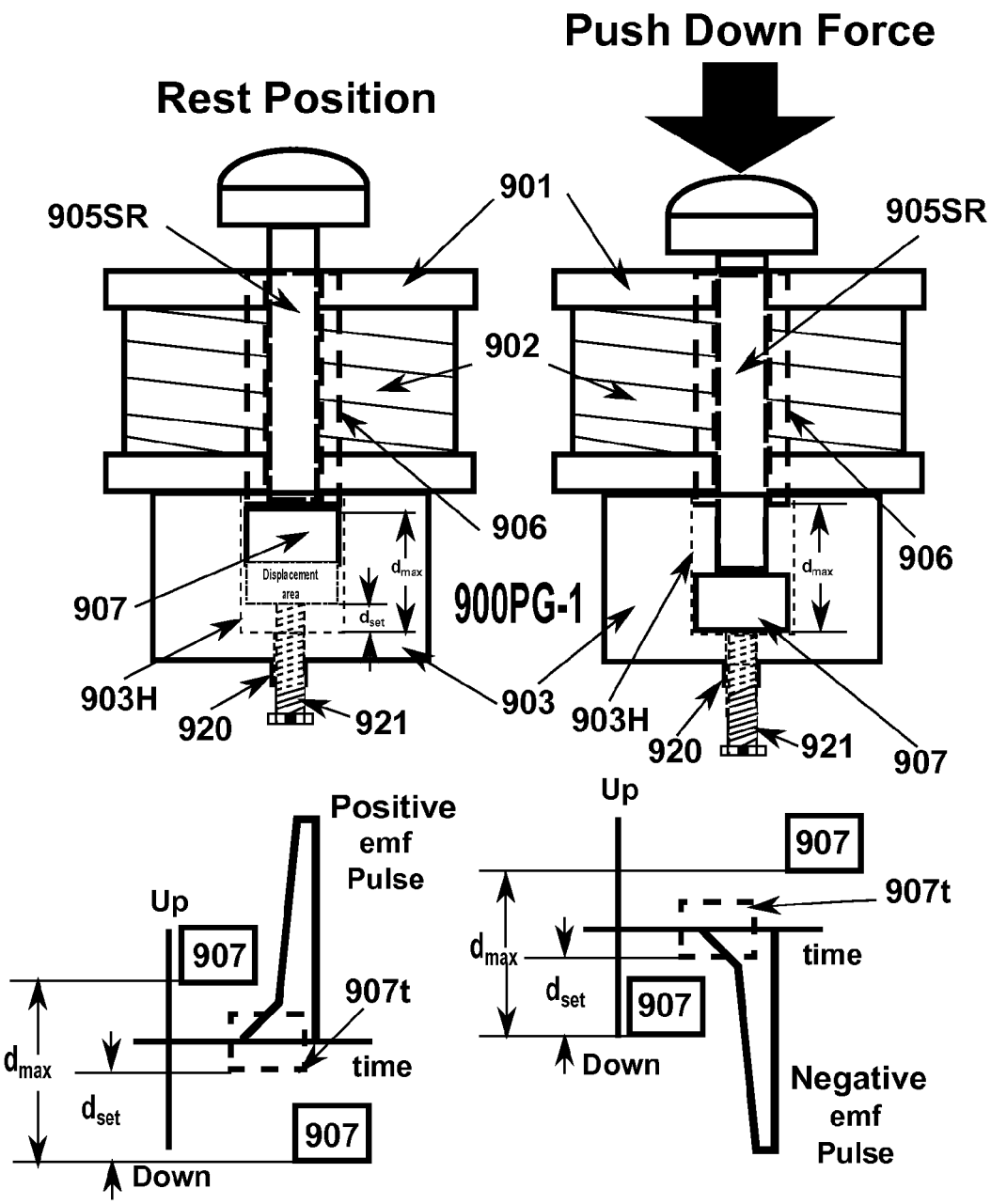
FIG. 14 is an illustration of an embodiment utilizing a set screw arrangement to manually adjust the down and up displacement of the magnet within the bottom enclosure blind-hole well.

A set of features of an embodiment of the present invention 900PG-1 of the present invention is illustrated in FIG. 14, where a displacement set screw 921 that is adjustable to move in and out of the bottom enclosure 903 by a displacement distance $d_{set}$ that minimizes and maximizes the total travel displacement range $d_{max}$ for the axial poled magnet 907 to travel through within the bottom enclosure 903 blind-hole well 903H. This set of features of the embodiment of the present invention allows for operator push down travel distance variations for any purpose so deemed. In other embodiments, other elements may be dimensioned or positioned to selectively adjust the travel distance to maintain the desired magnetic attraction to the corresponding core.

An embodiment is an exemplary implementation or example of the present invention. Reference in the specifications to "an embodiment," "one embodiment," "some embodiments," or "other embodiments" means that a particular feature, structure, or characteristic described in connection with the embodiments is included in at least some embodiments, but not necessarily all embodiments of the present invention. The various appearances of 'an embodiment,' 'one embodiment,' or 'some embodiments' are not necessarily all referring to the same embodiments. If the specification states a component, feature, structure, or characteristic 'may,' 'might,' or 'could' be included, that particular component, feature, structure, or characteristic is not required to be included. If the specification or claim refers to 'a' or 'an' element, that does not mean there is only one of the element. If the specification or claims refer to 'an additional' element, that does not preclude there being more than one of the additional element. The present invention is not restricted to the particular details described herein. Indeed, many other variations of the foregoing description and drawings may be made within the scope of the present invention. Accordingly, these and further modifications and substitutions made by one skilled in the art are within the scope of the present invention, which is not to be limited except by the claims that follow.

What is claimed is:

1. An electrical generator, comprising:
   a coil support;
   a core comprising a high permeability member extending along an axis and comprising a first axial and a second axial end, and retained within said support;
   a magnet having a surface substantially engaging at least one of said core first axial and said second axial end and retained thereon by magnetic attraction from one of an N and a S pole of the magnet;
   an elongated push member extending substantially parallel said core and movable in and retained by said coil support and disposed to receive a substantially axial force and to provide said axial force applied to said magnet, wherein
      said magnet is releasable from said core by said applied axial force directed outward from said core resulting in a change in magnetic flux through said core upon release from said core and movement therefrom, and wherein
      said push member is disposed to limit separation of said magnet from said core at a maximum distance sufficient to allow said magnetic attraction to draw said magnet to said core upon withdrawal of said substantially axial force; and
   a coil disposed about said core providing an electrical signal in response to said change in magnetic flux.

2. The electrical generator of claim 1, wherein said core comprises a hollow substantially tubular member having an aperture therethrough.

3. The electrical generator of claim 2, wherein said hollow substantially tubular member comprise an outer diameter-to-inner diameter ratio of 1.5 or greater.

4. The electrical generator of claim 2, wherein said push member is movable within said hollow substantially tubular member.

5. The electrical generator of claim 4, wherein said push member further includes a pilot member magnetically attracted by said magnet.

6. The electrical generator of claim 1, wherein said core comprises a magnetic metal.

7. The electrical generator of claim 1, wherein said core is disposed to permit said magnet to come into contact with said core when attracted thereto.

8. The electrical generator of claim 1, further including a second push member extending substantially parallel to said first push member.

9. The electrical generator of claim 1, wherein said push member is disposed radially outside said coil.

10. The electrical generator of claim 1 further including a non-magnetic magnet enclosure connected to said push member and adapted to retain said magnet and to be movable by said push member.

11. The electrical generator of claim 1, wherein said magnet comprises a Neodymium magnet.

12. The electrical generator of claim 1, further including a member disposed to limit magnet motion to maintain a magnet position relative to said core sufficient to provide a magnet spring effect that urges said magnet towards said core at any point along a range of travel of said magnet.

13. An electrical generator, comprising:
   a coil support;
   a core comprising a high permeability hollow substantially tubular magnetic metal member extending along an axis and including an aperture therethrough comprising a first axial and a second axial end, and retained within said support;
   a magnet having a surface substantially engaging at least one of said core first axial and said second axial end and retained thereon by magnetic attraction from one of a N and a S pole of said magnet;
   a magnet rotation member angularly movable with respect to said core axis and movably retained by said coil support and disposed to receive a substantially oblique force and to provide an axial force to said magnet, wherein
      said magnet is releasable from said core by said applied substantially oblique force resulting in a change in magnetic flux through said core upon release from said core and movement therefrom, and wherein
      said magnet rotation member is disposed to limit separation of said magnet from said core at a maximum distance sufficient to allow said magnetic attraction to draw said magnet to said core upon withdrawal of said substantially axial force; and
   a coil disposed about said core providing an electrical signal in response to said change in magnetic flux.

14. The electrical generator of claim 13, wherein said core comprises a hollow substantially tubular member.

15. The electrical generator of claim 14, wherein said hollow substantially tubular member comprise an outer diameter-to-inner diameter ratio of 1.5 or greater.

16. The electrical generator of claim 13, further including an element disposed to maintain a magnet position relative to said core sufficient to provide a magnet spring effect that urges said magnet towards said core at any point along a range of travel of said magnet.

17. The electrical generator of claim 13, wherein said core is disposed to permit said magnet to come into contact with said core when attracted thereto.

* * * * *